United States Patent
Luschi et al.

(10) Patent No.: US 8,150,435 B2
(45) Date of Patent: Apr. 3, 2012

(54) REPORTING CHANNEL QUALITY INFORMATION

(75) Inventors: Carlo Luschi, Oxford (GB); Tarik Tabet, Bristol (GB); Abdelkader Medles, Bristol (GB); Nallepilli Ramesh, New Providence, NJ (US)

(73) Assignee: Icera Inc., Wilmington, DE (US)

( * ) Notice: Subject to any disclaimer, the term of this patent is extended or adjusted under 35 U.S.C. 154(b) by 15 days.

(21) Appl. No.: 12/673,568

(22) PCT Filed: Aug. 18, 2008

(86) PCT No.: PCT/EP2008/060804
§ 371 (c)(1),
(2), (4) Date: Nov. 22, 2010

(87) PCT Pub. No.: WO2009/024555
PCT Pub. Date: Feb. 26, 2009

(65) Prior Publication Data
US 2011/0105171 A1   May 5, 2011

(30) Foreign Application Priority Data

| Aug. 17, 2007 | (GB) | 0716134.2 |
| Sep. 27, 2007 | (GB) | 0718981.4 |
| Oct. 23, 2007 | (GB) | 0720725.1 |

(51) Int. Cl.
*H04B 7/00* (2006.01)
(52) U.S. Cl. .......... 455/513; 455/67.11; 455/67.16; 455/226.1; 370/252
(58) Field of Classification Search .......... 455/513, 455/67.11, 67.13, 67.16, 226.3, 226.1, 135, 455/277.2; 375/259, 260; 370/208, 465, 370/329, 252, 328, 344
See application file for complete search history.

(56) References Cited

U.S. PATENT DOCUMENTS

| 2005/0003782 A1* | 1/2005 | Wintzell | 455/226.3 |
| 2006/0209669 A1* | 9/2006 | Nishio | 370/208 |
| 2007/0058676 A1 | 3/2007 | Lim et al. | |
| 2010/0061258 A1* | 3/2010 | Seo et al. | 370/252 |
| 2010/0254326 A1* | 10/2010 | Sawahashi et al. | 370/329 |
| 2011/0142144 A1* | 6/2011 | Allpress et al. | 375/259 |
| 2011/0286353 A1* | 11/2011 | Blanz et al. | 370/252 |
| 2012/0008698 A1* | 1/2012 | Ktenas et al. | 375/259 |

FOREIGN PATENT DOCUMENTS

| EP | 1575234 A2 | 9/2005 |
| EP | 1750408 A2 | 2/2007 |
| WO | 2009024555 A1 | 2/2009 |

OTHER PUBLICATIONS

CQI Feedback Scheme for EUTRA; Nov. 11, 2005; 9 pages.
J. K. Cavers, "Variable-Rate Transmission for Rayleigh Fading Channels", IEEE Transactions on Communications, pp. 15-22, Feb. 1972.
W.T. Webb and R. Steele, "Variable Rate QAM for Mobile Radio", IEEE Transactions on Communications, pp. 2223-2230, Jul. 1995.

(Continued)

*Primary Examiner* — Sujatha Sharma (57) ABSTRACT

The present disclosure relates to a method of transmitting channel quality data for channels in a wireless communication system, and to a corresponding receiver and transmitter. In one embodiment, the method includes determining a plurality of channel quality indicators for a corresponding plurality of frequency intervals and transmitting information about channel quality indicators in the form of differentially encoded slope data.

36 Claims, 2 Drawing Sheets

OTHER PUBLICATIONS

B. Vucetic, "An Adaptive Coding Scheme for Time-Varying Channels", IEEE Transactions on Communications, pp. 653-663, May 1991.

K. M. Kamath and D. L. Goeckel, "Adaptive-Modulation Schemes for Minimum Outage Probability in Wireless Systems", IEEE Transactions on Communications, pp. 1632-1635, Oct. 2004.

R. Knopp and P.A. Humblet, "Information Capacity and Power Control in Single-Cell Multiuser Communications", Proceedings of IEEE International Conference on Communications, vol. 1, Seattle, USA, Jun. 1995, pp. 331-335.

3GPP TSG RAN WG1 #46bis, R1-062842 "CQI Design and its Impact of DL Performance", 2006.

3GPP TSG RAN LTE Ad Hoc, R1-061819 "Overhead Reduction of UL CQI Signalling for E-UTRA DL", 2006.

3GPP TSG RAN WG1 #47bis, R1-070187 "DCT Partitioning for CQI Reporting", 2007.

* cited by examiner

REPORTING CHANNEL QUALITY INFORMATION

CROSS-REFERENCE TO RELATED APPLICATION

This application is the National Stage of, and therefore claims the benefit of, International Application No. PCT/EP2008/060804 filed on Aug. 18, 2008, entitled "REPORTING CHANNEL QUALITY INFORMATION," which was published in English under International Publication Number WO 2009/024555 on Feb. 26, 2009, and has priority based on GB 0716134.2 filed on Aug. 17, 2007, GB 0718981.4 filed on Sep. 27, 2007, and GB 0720725.1 filed on Oct. 23, 2007. Each of the above applications is commonly assigned with this National Stage application and is incorporated herein by reference in their entirety.

TECHNICAL FIELD

This application relates to reporting Channel Quality Information in wireless systems, for example cellular wireless systems.

BACKGROUND

Link adaptation by means of adaptive modulation and coding enables robust and spectrally efficient transmission over time-varying channels in a wireless system. The basic idea behind it is to estimate the channel at a receiver and feed this estimate back to a transmitter. The latter adjusts its transmission in order to adapt the modulation scheme and the code rate to the channel characteristics. Modulation and coding schemes that do not adapt to fading conditions require a fixed link margin to support an acceptable performance when the channel quality is poor. These systems are then designed for the worst-case channel conditions, and result in an inefficient use of the channel. Thus adaptive modulation and coding schemes are appealing, since they can increase the average throughput, and reduce the required transmit power and bit error rate. See for example the following references: (1) J. K. Cavers, "Variable-Rate Transmission for Rayleigh Fading Channels", *IEEE Transactions on Communications*, pp. 15-22, February 1972; (2) W. T. Webb and R. Steele, "Variable Rate QAM for Mobile Radio", *IEEE Transactions on Communications*, pp. 2223-2230, July 1995; (3) B. Vucetic, "An Adaptive Coding Scheme for Time-Varying Channels", *IEEE Transactions on Communications*, pp. 653-663, May 1991; and (4) K. M. Kamath and D. L. Goeckel, "Adaptive-Modulation Schemes for Minimum Outage Probability in Wireless Systems", *IEEE Transactions on Communications*, pp. 1632-1635, October 2004.

Moreover, a radio channel is always subject to some degree of frequency selectivity, implying that the channel quality will vary in the frequency domain. This variation in frequency can be beneficial for a link adaptation scheme over the frequency axis for multi-carrier systems such as OFDM systems. With adaptive modulation and coding in the frequency domain, a higher-order modulation (e.g., 16QAM or 64QAM) together with a high code rate is appropriate for frequency intervals (e.g., subcarriers or groups of sub-carriers) experiencing advantageous channel conditions in the frequency domain, where QPSK modulation and low-rate coding are used for frequency intervals with poor radio link conditions.

SUMMARY

According to one aspect of the present disclosure, there is provided a method of transmitting channel quality data for channels in a wireless communication system. In one embodiment, the method includes: determining a plurality of channel quality indicators for a corresponding plurality of frequency intervals; selecting at least one best channel quality indicator and its corresponding frequency interval; generating slope data relating the at least one best channel quality indicator to the channel quality indicator of at least one adjacent frequency interval; and transmitting the at least one best channel quality indicator, an identifier of its frequency interval and the slope data.

Another aspect disclosed herein provides a method of generating channel quality data for scheduling transmission in a wireless communication system. In one embodiment, a method of generating includes: receiving at least one best channel quality indicator, an identifier of its corresponding frequency interval and slope data relating the best channel quality indicator to the channel quality indicator of at least one adjacent frequency interval; and generating the channel quality indicator for the adjacent frequency interval using the best channel quality indicator and the slope data.

In yet another aspect, a method for generating channel quality data for scheduling transmission in a wireless communication system is disclosed. In one embodiment, the method for generating includes: determining a plurality of channel quality indicators for a plurality of frequency intervals; and transmitting: a channel quality indicator value for at least one selected frequency interval; the channel quality indicator for all other frequency intervals, each transmitted differentially with respect to the channel quality indicator of an adjacent frequency interval. The transmitting step may further comprise transmitting the average channel quality indicator over the frequency intervals.

In still another aspect, a method for scheduling transmission in a wireless communication system is disclosed. In one embodiment, the method for scheduling transmission includes: receiving channel quality indicator information comprising: at least one individual channel quality indicator value for selected frequency intervals; and the channel quality indicator for all other frequency intervals, each transmitted differentially with respect to the channel quality indicator of an adjacent frequency interval; and scheduling transmission based on the received channel quality indicator information.

In yet still another aspect, a receiver arranged to receive radio frequency signals via a wireless communication channel and adapted to transmit channel quality data to a transmitter of the signals is disclosed. In one embodiment, the receiver includes: means for determining a plurality of channel quality indicators for a plurality of frequency intervals; and means for transmitting: a channel quality indicator value for at least one selected frequency interval; the channel quality indicator for all other frequency intervals, each transmitted differentially with respect to the channel quality indicator of an adjacent frequency interval.

In a different aspect, a transmitter for transmitting radio frequency signals over a wireless communication channel is disclosed. In one embodiment, the transmitter includes: means for receiving channel quality indicator information comprising: at least one individual channel quality indicator value for selected frequency intervals; and the channel quality indicator for all other frequency intervals, each transmitted differentially with respect to the channel quality indicator of an adjacent frequency intervals; and means for scheduling transmission based on the received channel quality indicator information.

BRIEF DESCRIPTION

Reference is now made by way of example to the following descriptions taken in conjunction with the accompanying drawings, in which.

DETAILED DESCRIPTION

Figure 1:
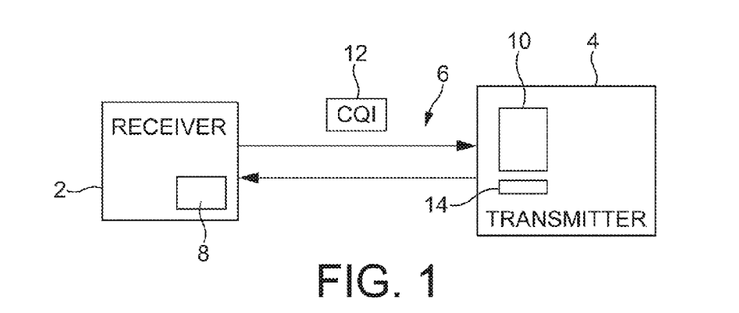
FIG. 1 is a schematic block diagram of a receiver and a transmitter in a wireless communications system.

The advantages of adaptive modulation and coding have motivated its use in advanced wireless communication systems, including cellular systems like EGPRS and HSPA as well as wireless LANs. FIG. 1 is a schematic diagram of a receiver 2 communicating with a transmitter 4 via a wireless channel 6. The transmitter and receiver can be a base station (or Node-B) and a mobile terminal (or user equipment (UE)), adapted for use in a wireless cellular environment. The receiver 2 has a processor 8 for, amongst other things, estimating the channel quality and providing a channel quality indicator (CQI) value. The transmitter includes a processor 10 for, amongst other things, implementing adaptive modulation and coding based on CQIs it receives from the receiver. It will readily be appreciated that FIG. 1 is greatly simplified—in practice there can be a plurality of receivers and transmitters, with a multiplicity of channels, which vary in quality with time and in the frequency domain.

Another appealing scheme that maximizes the spectral efficiency of a wireless system is channel-dependent scheduling implemented by a packet scheduler 14. This mechanism controls the allocation of the shared resources (e.g. frequency intervals for multi-carrier system like OFDM) at each instant. It is closely related to adaptive modulation and coding scheme and often they are seen as one joint function as they are both trying to adapt to the channel conditions. The first objective of downlink scheduling, for example, is to make the users orthogonal by different multiplexing techniques: Time Division Multiplexing, Frequency Division Multiplexing, Code Division Multiplexing or Spatial Division Multiplexing. The second objective is the maximization of the radio resources. When transmissions to multiple users occur in parallel, resources (in code/frequency/time/space domain) are assigned to users with the best instantaneous channel conditions. See, for example, R. Knopp and P. A. Humblet, "Information Capacity and Power Control in Single-Cell Multiuser Communications", *Proceedings of IEEE International Conference on Communications*, vol. 1, Seattle, USA, June 1995, pp. 331-335. This strategy is an example of channel dependent opportunistic scheduling, where the scheduler takes into account only the instantaneous radio-link conditions. Other strategies can take into account delay, fairness—in general parameters related to QoS constraints.

To enable adaptive modulation and coding and channel-dependent opportunistic scheduling, the mobile terminal or User Equipment (UE) reports a Channel Quality Indicator (CQI) 12. In an OFDM system, to support downlink scheduling in the frequency domain coupled with a link adaptation scheme with a plurality of users, each user needs to report a CQI per frequency interval (group of sub-carriers) and over time. In order to provide full flexibility at the packet scheduler 14, the UE 2 would need to report CQIs 12 over the entire frequency band, making the signalling overhead impractically large.

Figure 2:
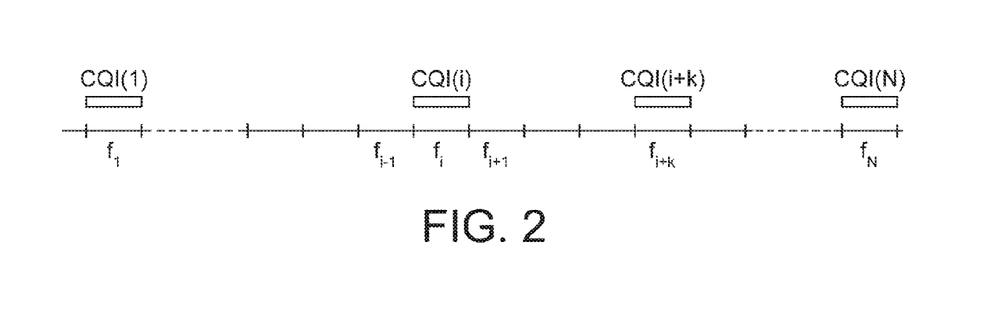
FIG. 2 is a schematic diagram showing reported CQI and frequency intervals.

FIG. 2 is a schematic diagram of a frequency band with frequency intervals $f_1 \ldots f_N$. Each frequency interval corresponds for instance to a predefined number of adjacent OFDM sub-carriers.

Many solutions have been proposed for CQI feedback reduction, to allow frequency selective scheduling with reduced signalling overhead. These solutions range from uniform reporting grid of CQI, where a CQI (CQI(1) ... CQI(N)) is reported for each frequency interval $f_1 \ldots f_N$ (impractical from the point of view of the implementation complexity), to reporting only the indication of the best CQI and the best frequency interval (e.g., CQI(i) for interval $f_i$). The latter scheme is based on the fact that a user will be preferentially scheduled on its best frequency interval, and therefore the CQI for the best resource block is of primary interest to the scheduler 14. A variation of the latter scheme is to report the CQIs for the best-M frequency intervals, e.g., CQI(1), CQI(j), CQI(i+k) for $f_1$, $f_j$ and $f_{i+k}$ (M=3). Another possibility is to adopt a threshold-based CQI report, based on the feedback of the average CQI over the frequency intervals that are within the threshold from the best CQI. On top of these schemes, it has been proposed to apply some known compression methods such as Discrete Cosine Transform or Wavelet Transform to further reduce the number of bits required to encode the CQI reports.

The disadvantages of these schemes include:

Lack of scheduling flexibility—For different reasons such as system overload, scheduling type or practical reasons, the packet scheduler may need to assign to the users different frequency intervals than the one reported. The CQI schemes reported above do not provide channel quality information for other than the reported frequency intervals. In the case of feedback of averaged CQIs, reporting averaged channel quality may destroy channel information. Depending on channel variability in frequency and/or time, the averaging could destroy the information about the channel condition at specific frequencies.

Signalling overhead—The schemes mentioned above need to report the index i of frequency intervals to which the reported CQIs are referred.

The disclosure discusses embodiments that provide schemes for CQI reporting, which aim to decrease the required signalling overhead and to increase the robustness and performance of the system. In addition to reporting the CQI of the best-M frequency intervals of the radio frequency band available for transmission, the proposed schemes report information which the packet scheduler can use in order to reconstruct the CQI of frequency intervals adjacent to the best-M ones. Depending on the channel selectivity, adjacent frequency intervals experience correlated channel conditions. This information is not taken into account by the prior art schemes described above but is exploited here. As a result, the scheduler is provided with more freedom in opportunistic scheduling of the users in the frequency domain.

The information needed for the reconstruction of the CQI on adjacent frequency intervals is the slope or any variation of the slope of CQI over frequency as it will be illustrated in detail in the description of the various embodiments. Reporting the slope of the CQI of adjacent frequency intervals requires a reduced amount of information compared to the transmission of the full CQI value for adjacent frequency intervals. Moreover, since the slope data concerns adjacent frequency intervals, their indices do not need to be reported, which results in an additional saving in terms of signalling overhead. Accordingly, the following described embodiments of the disclosure rely on the use of the local information of the channel around a particular frequency interval, in order to reconstruct the channel quality indicator over adjacent frequency intervals.

Figure 3:
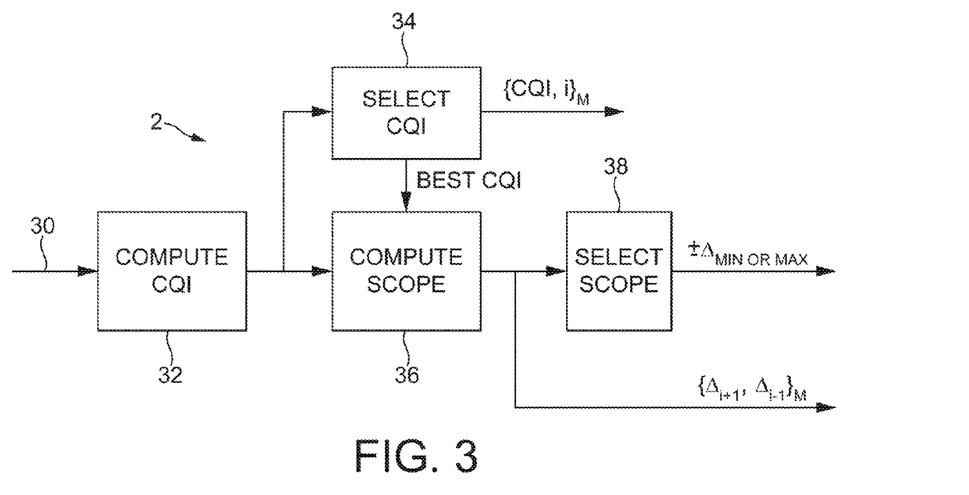
FIG. 3 is a schematic block diagram of a receiver in accordance with one embodiment of the disclosure.
Figure 4:
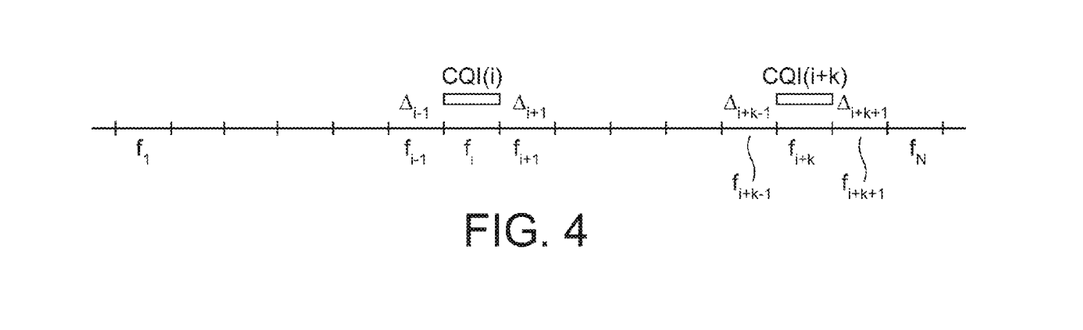
FIG. 4 is a schematic diagram showing reported CQI and slope data with corresponding frequency intervals.

FIG. 3 is a schematic block diagram of components of a receiver for transmitting channel quality information and slope data in accordance with embodiments of the disclosure. FIG. 3 is schematic only and is drawn in the form of functional blocks. In practice, these components can be implemented by a suitably programmed processor. The receiver 2 computes the CQI (block 32) from incoming channel related parameters 30 (e.g., from a measure of the signal-to-interference plus noise power ratio on each frequency interval) for all frequency intervals of the radio bandwidth available for transmission. One or more values of CQI are selected (block 34) as being the best CQIs. Typically more than one CQI is reported as best and when there are M CQIs these are referred to as the best-M CQI. The frequency index i associated with each CQI is also reported. A compute slope block 36 receives the best-M CQI and computes the slope for adjacent frequency intervals around each of the best-M CQI. This is illustrated more clearly in FIG. 4 and described later. In some embodiments, also discussed later, a select slope block 38 determines which slopes to report. In the compute slope block 36, the slope is computed as:

$$\text{slope}_{right} = \Delta_{i+1} = CQI(i+1) - CQI(i), \text{slope}_{left} = \Delta_{i-1} = CQI(i) - CQI(i-1)$$

where i is the index of the frequency interval. FIG. 4 shows 2 best CQIs, CQI(i) and CQI(i+k), but in practice there could be several (M). In this case, the scheduler 14 at the transmitter (FIG. 1) has 3M frequency intervals available for scheduling. The user does not require to send the indices of the frequency intervals for the 2M extra frequency intervals i−1, i+1; i+k−1, i+k+1.

The proposed (best-M+Slopes) scheme compares favourably to the known best-3M scheme. The latter requires $$3bM + \left\lceil \log_2 \binom{N}{3M} \right\rceil$$

bits for signalling, where b indicates the number of bits necessary to represent each CQI value, and N the number of frequency intervals. The scheme of this embodiment of the present disclosure needs $$bM + \left\lceil \log_2 \binom{N}{M} \right\rceil + 2dM$$

bits, where d is the number of bits required to encode the slope. For practical systems, the (best-M+Slopes) scheme requires less bits (d is much smaller than b and M is also relatively small compared to N). As an application example, in a LTE system, M=3 N=25 b=5 and d=2 is a reasonable value, the best-M scheme requires 66 bits whereas the (best-M+Slopes) scheme requires 39 bits, and for M=4, the best-M scheme requires 83 bits whereas the (best-M+Slopes) scheme requires 50 bits.

In case the best-M frequency intervals contain some adjacent frequency intervals, the best-M frequency intervals may be selected to include only the best non-adjacent frequency intervals or the best frequency intervals among groups of three adjacent frequency intervals. Mainly, this ensures that the number of reported frequency intervals is always the same, i.e., 3M. For each of the M best frequency intervals, the selection procedure is not allowed to associate an adjacent frequency interval with a CQI higher than the corresponding best frequency interval. This procedure for the selection of the best-M non adjacent frequency intervals can be used only for this embodiment of the proposed scheme.

A second embodiment of the scheme of the present disclosure is obtained by better using the correlation of the radio channel in the frequency domain. The receiver 2 may report the CQI for only the best- $$\left\lceil \frac{M}{2} \right\rceil$$

frequency intervals, and the absolute value and the sign of the slope with the minimum absolute value between each of the best $$\left\lceil \frac{M}{2} \right\rceil$$

frequency intervals and its two adjacent frequency intervals. The slope $\text{slope}_{min} = \Delta_{min}$ with the minimum absolute value is selected by the select slope block 38. In practice, for each one of the M/2 best frequency intervals, the user will report the slope to the best adjacent frequency interval (either the left slope $\Delta_{i-1}$ or the right slope $\Delta_{i+1}$). By this scheme, the packet scheduler 14 will be given $$2\left\lceil \frac{M}{2} \right\rceil$$

frequency intervals for scheduling. The motivation behind this scheme is in the fact that the CQI of the $$\left\lceil \frac{M}{2} \right\rceil$$

frequency intervals adjacent to the best- $$\left\lceil \frac{M}{2} \right\rceil$$

are very close to the other following best- $$\left\lceil \frac{M}{2} \right\rceil$$

frequency intervals that would be reported in the classical best-M scheme. Taking into account the frequency correlation of the channel, the CQI of the $$\left\lceil \frac{M}{2} \right\rceil$$

frequency intervals adjacent to the best- $$\lceil \tfrac{M}{2} \rceil$$

will often have a very good performance, close to the best- $$\lceil \tfrac{M}{2} \rceil$$

ones. Hence this scheme will require the feedback of $$b \lceil \tfrac{M}{2} \rceil + \left\lceil \log_2 \left( \begin{array}{c} N \\ \lceil \tfrac{M}{2} \rceil \end{array} \right) \right\rceil + d \lceil \tfrac{M}{2} \rceil + \lceil \tfrac{M}{2} \rceil$$

bits, where the last term represents the information needed to inform about the position of the slope (left or right).

In a third embodiment, the absolute value and the sign of the slope with the maximum absolute value between each of the best $$\lceil \tfrac{M}{2} \rceil$$

frequency intervals and its two adjacent frequency intervals (which corresponds to the worst CQI between the two adjacent frequency intervals) is reported. In this case, the user will report the best- $$\lceil \tfrac{M}{2} \rceil$$

frequency intervals and the maximum (absolute) slope of the frequency intervals adjacent to the best frequency intervals as the slope data for each frequency interval adjacent to the best frequency intervals. For example, where $\Delta_{i+1}$ is greater than $\Delta_{i-1}$, only $\Delta_{i+1}$ is transmitted, and is used as the slope data for $f_{i-1}$ as well as $f_{i+1}$ when reconstructing the CQIs. In total, the scheduler will have $$\lceil \tfrac{M}{2} \rceil + 2 \lceil \tfrac{M}{2} \rceil = 3 \lceil \tfrac{M}{2} \rceil$$

frequency intervals available for scheduling. Again, this scheme relies on the frequency correlation of the radio channel. The signalling needed for this scheme is $$b \lceil \tfrac{M}{2} \rceil + \left\lceil \log_2 \left( \begin{array}{c} N \\ \lceil \tfrac{M}{2} \rceil \end{array} \right) \right\rceil + d \lceil \tfrac{M}{2} \rceil$$

bits. The classical best-M scheme requires $$3b \lceil \tfrac{M}{2} \rceil + \left\lceil \log_2 \left( \begin{array}{c} N \\ 3\lceil \tfrac{M}{2} \rceil \end{array} \right) \right\rceil$$

bits.

In a fourth embodiment (not illustrated), the average of the slope between each of the best $$\lceil \tfrac{M}{2} \rceil$$

frequency intervals and its two adjacent frequency intervals is reported $$\text{slope}_{av} = \Delta_{av} = (\tfrac{1}{2})(|\Delta_{i-1}| + |\Delta_{i+1}|),$$

together with the best $$\lceil \tfrac{M}{2} \rceil$$

frequency intervals. In this case, the scheduler uses the average slope as a slope data for each frequency interval adjacent to the best $$\lceil \tfrac{M}{2} \rceil$$

frequency intervals. The average slope or the maximum slope is a more conservative scheme that tends to have less errors than the target block error rate. In total, the scheduler will have $$\lceil \tfrac{M}{2} \rceil + 2 \lceil \tfrac{M}{2} \rceil = 3 \lceil \tfrac{M}{2} \rceil$$

frequency intervals available for scheduling. Again, this scheme relies on the frequency correlation of the radio channel. The signalling needed for this scheme is $$b \lceil \tfrac{M}{2} \rceil + \left\lceil \log_2 \left( \begin{array}{c} N \\ \lceil \tfrac{M}{2} \rceil \end{array} \right) \right\rceil + d \lceil \tfrac{M}{2} \rceil$$

bits. The classical best-M scheme requires $$3b \lceil \tfrac{M}{2} \rceil + \left\lceil \log_2 \left( \begin{array}{c} N \\ 3\lceil \tfrac{M}{2} \rceil \end{array} \right) \right\rceil$$

bits.

In a fifth embodiment, for each of the best $$\lceil \tfrac{M}{2} \rceil$$

frequency intervals only the index of the best of the two adjacent frequency intervals may be reported, together with the best $$\left\lceil \frac{M}{2} \right\rceil$$

frequency intervals. The CQI value of each of the best $$\left\lceil \frac{M}{2} \right\rceil$$

frequency intervals will then be used for the best of its two adjacent frequency intervals.

That is, in the fifth embodiment, the receiver 2 may report the CQI for only the best- $$\left\lceil \frac{M}{2} \right\rceil$$

frequency intervals, and for each of these best $$\left\lceil \frac{M}{2} \right\rceil$$

frequency intervals, also reports the index of the adjacent frequency interval with the minimum absolute value of the slope to the considered best frequency interval. In this case, the slope data transmitted back by the receiver 2 may only need to be the index of the adjacent frequency interval having the minimum slope for each of the M/2 best frequency intervals, rather than a measurement of the slope itself. With this approach, the packet scheduler 14 will be given $$2\left\lceil \frac{M}{2} \right\rceil$$

frequency intervals for scheduling. This scheme relies on the fact that the CQI of the $$\left\lceil \frac{M}{2} \right\rceil$$

frequency intervals adjacent to the best- $$\left\lceil \frac{M}{2} \right\rceil$$

will often be very close to the best- $$\left\lceil \frac{M}{2} \right\rceil$$

ones, taking into account the frequency correlation of the channel. So the scheduler 14 can approximate that the best adjacent frequency interval has the same CQI as the best frequency interval to which it is adjacent. Hence this scheme will require the feedback of $$b\left\lceil \frac{M}{2} \right\rceil + \left\lceil \log_2\binom{N}{\left\lceil \frac{M}{2} \right\rceil} \right\rceil + \left\lceil \frac{M}{2} \right\rceil$$

bits.

A sixth embodiment (not illustrated) is based on the measure of the maximum slope among the K adjacent intervals on the right $$slope_{max,right}(K) = \max_{j=1,\ldots,K} \frac{|\Delta_{i+j}|}{j}$$

and the maximum slope among the K adjacent intervals on the left $$slope_{max,left}(K) = \max_{j=1,\ldots,K} \frac{|\Delta_{i-j}|}{j}.$$

The reconstructed CQI at the Node-B for all K right adjacent frequency intervals will then be $$CQI_{rec}(i+k) = CQI(i) - k \cdot slope_{max,right}(K), k=1, \ldots, K,$$

where i is the index of one of the best-M frequency intervals.

The parameter K is the reconstruction horizon and is used to adapt to the frequency selectivity of the channel. Hence, the user will report the CQI for the best-M frequency interval, and for each frequency interval selected, the user will additionally report the maximal right and left slope. The parameters K is not sent on each report, its rate of report in time is very slow or can be communicated by the scheduler (Node-B). This scheme may only need $$bM + \left\lceil \log_2\binom{N}{M} \right\rceil + 2dM$$

bits and offers M+2KM frequency intervals/scheduling opportunities. Equally, reporting the maximum value of the right and left slopes may only apply here as well.

This scheme could be extended by making the reconstruction horizon variable. The latter is defined as:

$$L_{right} = \arg\max_{j=1,\ldots,K} \frac{|\Delta_{i+j}|}{j}$$

$$L_{left} = \arg\max_{j=1,\ldots,K} \frac{|\Delta_{i+j}|}{j}$$

And the reconstructed CQI at the Node-B for all $L_{right}$ right adjacent frequency intervals will then be $$CQI_{rec}(i+k) = CQI(i) - k \cdot slope_{max,right}(K), k=1, \ldots, L_{right},$$

where i is the index of one of the best-M frequency intervals. This scheme may only need $$bM + \left\lceil \log_2 \binom{N}{M} \right\rceil + 2dM + \log_2(K)$$

bits and offers M+$L_{right}$M+$L_{left}$M frequency intervals/scheduling opportunities. The parameter K for simplicity could be fixed in advance.

In a seventh embodiment (not illustrated) the slope data is computed as the maximum variation of the CQI values among K-adjacent intervals on the right and on the left of the best-M CQI are computed. The CQI for all K right adjacent frequency intervals will be $$CQI(i+k) = lCQI(i) + (1-l)\left[CQI(i) - \max_{j=1,\ldots,K}|\Delta_{i+j}|\right],$$

$$k = 1, \ldots, K,$$

$$CQI(i-k) = lCQI(i) + (1-l)\left[CQI(i) - \max_{j=1,\ldots,K}|\Delta_{i-j}|\right],$$

$$k = 1, \ldots, K$$

where i is the index of one of the best-M frequency intervals. $0 \leq l \leq 1$ is parameter that can be used to adjust the performance of the scheme depending on the channel variations. l=1 is used when the channel does not vary much between frequency intervals and the max CQI could be repeated over the adjacent frequency intervals. However, for l=0 the scheme is very conservative, since it is designed for the worst frequency interval among the adjacent ones. Similarly, the parameter K is used to adapt to the variability of the channel. Hence the user will report the CQI for the best-M frequency interval, and for each frequency interval selected, the user will additionally report the maximal right and left slope. The parameters K and l are not sent on each report, their rate of report in time is very slow or can be communicated by the scheduler. This scheme may only need $$bM + \left\lceil \log_2 \binom{N}{M} \right\rceil + 2dM$$

bits and offers M+2KM frequency intervals/scheduling opportunities. One could further refine this scheme by supporting a different parameter L for each of the K adjacent intervals.

Figure 5:
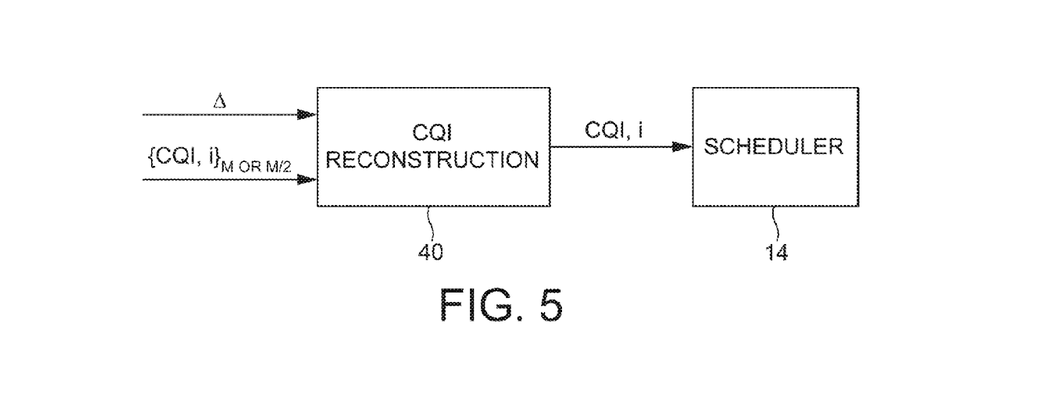
FIG. 5 is a schematic block diagram showing a transmitter in accordance with one embodiment of the disclosure.

FIG. 5 is a schematic diagram of functional blocks located at a transmitter where a CQI reconstruction block 40 receives best-M or $$\left\lceil \frac{M}{2} \right\rceil CQI$$

and frequency interval information, together with slope data as described above in relation to each of the seven embodiments. Depending on the nature of the information received, the CQI reconstruction block 40 reconstructs the CQIs for each of the frequency intervals adjacent to the reported best intervals using the slope data. The best M or $$\left\lceil \frac{M}{2} \right\rceil CQIs,$$

plus the reconstructed CQI together with the frequency interval indexes are supplied to the packet scheduler 14.

An eighth embodiment is based on a receiver, such as a mobile station or user equipment, determining or computing channel quality indicator information for the relevant frequency intervals. The relevant frequency intervals are defined as constituting the relevant frequency bandwidth, which may correspond to the entire system bandwidth. The channel quality indicator information may be determined for each of the frequency intervals of the relevant bandwidth, or may be determined for the full relevant bandwidth to be considered in the channel quality indicator report to be generated.

After the determination, the receiver sends a channel quality indicator report to the transmitter. The receiver may transmit a channel quality indicator value for at least one selected frequency interval and the channel quality indicator of all other frequency intervals, each transmitted differentially with respect to the channel quality indicator of an adjacent frequency interval.

Optionally, the receiver may also transmit the wideband average channel quality indicator, i.e., the average channel quality indicator over all the frequency intervals for which the report is generated. In this case, the channel quality indicator value for at least one selected frequency interval may be transmitted differentially with respect to the wideband average channel quality indicator.

One implementation of this scheme may, for example, adapt the receiver to transmit (or report): the channel quality indicator of a first frequency interval or sub-band; the difference or change (delta) in the channel quality indicator between the second and first frequency interval; the difference or change (delta) in the channel quality indicator between the third and second frequency interval; and the difference or change (delta) in the channel quality indicator between the Nth and the (N−1)th frequency interval.

The first frequency interval or sub-band may be the leftmost or right-most interval or sub-band (or lowest or highest sub-band). N denoted, in this example, the total number of frequency intervals for which the channel quality indicator report is generated.

In one implementation a technique is provided to reduce the possibility of error propagation in the above described scheme. To achieve this improvement, after a predetermined number n of frequency intervals or sub-bands the actual channel quality indicator value is reported, before reverting to reporting the difference or change in the channel quality indicator for each interval or sub-band compared to the preceding adjacent interval or sub-band.

Thus, for interval n+1 the channel quality indicator of the (n+1)th frequency interval is reported. For interval n+2 the change or difference in the channel quality indicator between the (n+2)th and the (n+1)th frequency interval is reported. The reporting then continues as discussed above until the (2n+1)th interval.

For interval 2n+1 the channel quality indicator of the (2n+1)th frequency interval is reported. For interval 2n+2 the change or difference in the channel quality indicator of the (2n+2)th and the (2n+1)th frequency interval is reported. The reporting then continues as discussed above until the (3n+1)th interval.

For interval 3n+1 the channel quality indicator of the (3n+1)th frequency interval is reported. For interval 3n+2 the change or difference in the channel quality indicator of the (3n+2)th and the (3n+1)th frequency interval is reported. The reporting then continues as discussed above until the (4n+1)th interval. The reporting may continue in this way.

In this eighth embodiment, as noted above, the channel quality indicator report may also include feedback of the average channel quality indicator over all frequency intervals. In this eighth embodiment, the channel quality indicator report transmitted by the receiver is received by the transmitter. The transmitter is adapted to utilize the received channel quality indicator report to schedule transmissions from the transmitter. Appropriate means are provided in the receiver and the transmitter for implementing the eighth embodiment, suitably adapted where appropriate.

The above described embodiments differ from known schemes by use of information available through the channel correlation. Further, additional information is encoded in the slope of the CQI as a function of the frequency interval. The main advantage of reporting the information in the slope is to give more opportunities to the scheduler. The information on the slope of adjacent frequency intervals should be seen first as extra redundancy information, since it adds the possibility to schedule the user on another frequency interval. The transmission of information on the slope of adjacent frequency intervals can also be seen as a compression scheme, since reporting the variation of the CQI value and the index of the adjacent frequency intervals (right/left information) requires less bits than reporting the actual CQI.

The proposed CQI feedback scheme has the following advantages:

Increases the multi-user diversity gain, by giving more scheduling opportunities.

Reduces user collisions, by providing more scheduling opportunities and more information about the channel.

Reduces the signalling overhead, especially in the case of Multiple-Input Multiple-Output (MIMO) transmission.

Enables better channel tracking, since it provides more information. This could be used to reduce the signalling overhead in the time domain (through a longer time period of CQI reports).

The disclosure also has application in a MIMO scheme, where a CQI per spatial stream needs to be reported. Thus, the CQI feedback scheme described in this disclosure could be used in order to exploit the spatial correlation of the channel and hence further reduce the CQI signalling overhead. This reduction in overhead is even more beneficial for systems with high number of antennas and number of users.

Other applications and configurations of the disclosure may be apparent to the person skilled in the art given the disclosure herein. The scope of the disclosure is not limited by the described embodiments.

What is claimed is:

1. A method of transmitting channel quality data for channels in a wireless communication system comprising:
    determining a plurality of channel quality indicators for a corresponding plurality of frequency intervals;
    selecting at least one best channel quality indicator and its corresponding frequency interval;
    generating slope data relating to said at least one best channel quality indicator to the channel quality indicator of at least one adjacent frequency interval; and
    transmitting said at least one best channel quality indicator, an identifier of its frequency interval and said slope data.

2. A method according to claim 1, comprising selecting a plurality M of best channel quality indicators.

3. A method according to claim 1, comprising the step of transmitting slope data for each frequency interval adjacent to the frequency intervals corresponding to the best channel indicator(s).

4. A method according to claim 1 comprising the step of selecting said slope data as the minimum slope data of the frequency intervals adjacent to the frequency interval corresponding to said at least one best channel quality indicator, and transmitting said minimum slope data for one adjacent frequency interval for each best channel quality indicator with an indication as to which adjacent frequency interval.

5. A method according to claim 2 comprising the step of selecting said slope data as the minimum slope data of the frequency intervals adjacent to the frequency interval corresponding to said at least one best channel quality indicator, and transmitting said minimum slope data for one adjacent frequency interval for each best channel quality indicator with an indication as to which adjacent frequency interval.

6. A method according to claim 1 comprising the step of selecting said slope data as the maximum slope data of said the adjacent frequency intervals.

7. A method according to claim 2 comprising the step of selecting said slope data as the maximum slope data of said the adjacent frequency intervals.

8. A method according to claim 1 comprising the step of selecting said slope data as an average of slope data of said adjacent frequency intervals.

9. A method according to claim 2 comprising the step of selecting said slope data as an average of slope data of said adjacent frequency intervals.

10. A method according to claim 1 comprising the step of selecting said slope data as said indication as to which adjacent frequency interval corresponds to the above minimum slope between the frequency intervals adjacent to the frequency interval corresponding to said at least one best channel quality indicator, and transmitting only said indication of the best adjacent frequency interval.

11. A method according to claim 2 comprising the step of selecting said slope data as said indication as to which adjacent frequency interval corresponds to the above minimum slope between the frequency intervals adjacent to the frequency interval corresponding to said at least one best channel quality indicator, and transmitting only said indication of the best adjacent frequency interval.

12. A method according to claim 1, wherein:
    the step of generating slope data comprises determining which adjacent frequency interval, of those adjacent to the frequency interval corresponding to said at least one best channel quality indicator, has the least slope; and
    the transmitting of said slope data comprises transmitting an indication as to which adjacent frequency interval has said least slope.

13. A method according to claim 2, wherein:
    the step of generating slope data comprises determining which adjacent frequency interval, of those adjacent to the frequency interval corresponding to said at least one best channel quality indicator, has the least slope; and
    the transmitting of said slope data comprises transmitting an indication as to which adjacent frequency interval has said least slope.

14. A method according to claim 1, wherein said slope data comprises slope data over a plurality K of adjacent frequency intervals.

15. A method according to claim 2, wherein said slope data comprises slope data over a plurality K of adjacent frequency intervals.

16. A method of generating channel quality data for scheduling transmission in a wireless communication system comprising:
  receiving a best channel quality indicator, an identifier of its corresponding frequency interval and slope data relating said best channel quality indicator to the channel quality indicator of at least one adjacent frequency interval; and
  generating the channel quality indicator for the adjacent frequency interval using the best channel quality indicator and the slope data.

17. A method according to claim 16, wherein:
  said slope data comprises an indication as to which adjacent frequency interval, of those adjacent to the frequency interval corresponding to said best channel quality indicator, has the least slope.

18. A method according to claim 17, wherein said step of generating the quality indicator comprises approximating the adjacent frequency interval with said least slope to have the same channel quality indicator as the frequency interval corresponding to said best channel quality indicator.

19. A receiver arranged to receive radio frequency signals via a wireless communication channel and adapted to transmit channel quality data to a transmitter of said signals, the receiver comprising:
  means for determining a plurality of channel quality indicators for a corresponding plurality of frequency intervals;
  means for selecting at least one best channel quality indicator and its corresponding frequency intervals;
  means for generating slope data relating said at least one best channel quality indicator to the channel quality indicator of at least one adjacent frequency intervals; and
  means for transmitting said at least one best channel quality indicator, an identifier of its corresponding frequency interval and said slope data.

20. A receiver according to claim 19, further comprising means for selecting from said slope data selected slope data for transmission.

21. A receiver according to claim 19, comprising means for averaging slope data for both adjacent intervals to the corresponding frequency interval.

22. A transmitter for transmitting radio frequency signals over a wireless communication channel, the transmitter comprising:
  means for receiving a best channel quality indicator, an identifier of its corresponding frequency interval and slope data relating said best channel quality indicator to the channel quality indicator of at least one adjacent frequency interval;
  means for generating a channel quality indicator for the adjacent frequency interval using the best channel quality indicator and the slope data; and
  scheduling means for scheduling said transmission based on the best channel quality indicator and/or the generated channel quality indicator.

23. A method for generating channel quality data for scheduling transmission in a wireless communication system, comprising:
  determining a plurality of channel quality indicators for a plurality of frequency intervals; and
  transmitting:
    a channel quality indicator value for at least one selected frequency interval;
    the channel quality indicator for all other frequency intervals, each transmitted differentially with respect to the channel quality indicator of an adjacent frequency interval.

24. A method according to claim 23 wherein the transmitting step further comprises transmitting the average channel quality indicator over the frequency intervals.

25. A method according to claim 23 in which the determining step further comprises determining a plurality of channel quality indicators for a plurality of frequency intervals of an entire system bandwidth.

26. A method according to claim 24 in which the determining step further comprises determining a plurality of channel quality indicators for a plurality of frequency intervals of an entire system bandwidth.

27. A method according to claim 23 in which the determining step further comprises determining the plurality of channel quality indicators for a plurality of frequency intervals of the full bandwidth of a channel quality indicator report.

28. A method according to claim 24 in which the determining step further comprises determining the plurality of channel quality indicators for a plurality of frequency intervals of the full bandwidth of a channel quality indicator report.

29. A method according to claim 23 in which the transmitting step comprises transmitting:
  a channel quality indicator for a first frequency interval; and
  a difference in the channel quality indicator between each other frequency interval and the preceding adjacent frequency interval.

30. A method according to claim 29 wherein the first frequency interval is the left-most or the right-most frequency interval.

31. A method for scheduling transmission in a wireless communication system, comprising:
  receiving channel quality indicator information comprising:
    at least one individual channel quality indicator value for selected frequency intervals; and
    the channel quality indicator for all other frequency intervals, each transmitted differentially with respect to the channel quality indicator of an adjacent frequency interval; and
  scheduling transmission based on the received channel quality indicator information.

32. A method according to claim 31 wherein the step of receiving further comprises: receiving an average channel quality indicator over the frequency intervals.

33. A receiver arranged to receive radio frequency signals via a wireless communication channel and adapted to transmit channel quality data to a transmitter of said signals, the receiver comprising:
  means for determining a plurality of channel quality indicators for a plurality of frequency intervals; and
  means for transmitting:
    a channel quality indicator value for at least one selected frequency interval;
    the channel quality indicator for all other frequency intervals, each transmitted differentially with respect to the channel quality indicator of an adjacent frequency interval.

34. A receiver according to claim 33 wherein further comprising means for transmitting the average channel quality indicator over the frequency intervals.

35. A receiver according to claim 34 wherein said channel quality indicator value for at least one selected frequency interval is transmitted differentially with respect to said average channel quality indicator over the frequency intervals, and the channel quality indicator for all other frequency intervals are transmitted differentially with respect to the channel quality indicator of an adjacent frequency interval.

36. A transmitter for transmitting radio frequency signals over a wireless communication channel, the transmitter comprising:

means for receiving channel quality indicator information comprising:

at least one individual channel quality indicator value for selected frequency intervals; and the channel quality indicator for all other frequency intervals, each transmitted differentially with respect to the channel quality indicator of an adjacent frequency intervals; and means for scheduling transmission based on the received channel quality indicator information.

* * * * *